United States Patent [19]
Ketzer
[11] 3,900,173
[45] Aug. 19, 1975

[54] RECORDING AND/OR PLAYBACK APPARATUS

[75] Inventor: Manfred Ketzer, Vienna, Austria
[73] Assignee: U.S. Philips Corporation, New York, N.Y.

[22] Filed: July 12, 1972
[21] Appl. No.: 271,015

[30] Foreign Application Priority Data
July 15, 1971 Austria .............................. 6161/71

[52] U.S. Cl. .............................. 242/201; 242/208
[51] Int. Cl. .............................. G03b 1/04; G11b 15/32
[58] Field of Search .............................. 242/201–206, 242/208–210; 274/4 D, 11 D; 360/73

[56] References Cited
UNITED STATES PATENTS

| | | | |
|---|---|---|---|
| 3,009,663 | 11/1961 | Armstead | 242/201 |
| 3,093,334 | 6/1963 | Andrews | 242/206 X |
| 3,554,465 | 1/1971 | Marukawa | 242/201 |

*Primary Examiner*—Leonard D. Christian
*Attorney, Agent, or Firm*—Frank R. Trifari; David R. Treacy

[57] ABSTRACT

Recording and/or playback apparatus having a first operating device for conditioning the apparatus for normal transport of a record carrier and a second operating device for conditioning the apparatus for fast-forward and/or rewind transport of a record carrier, a locking device for locking the operating devices in their operative positions being provided which is common to both operating devices and is arranged and constructed to be displaced against the action of a spring and which only if the first operating device is locked, is moved into a position in which cooperation of the second operating device with the locking device is prevented.

5 Claims, 6 Drawing Figures

RECORDING AND/OR PLAYBACK APPARATUS

The invention relates to a recording and/or playback apparatus having a first operating device for conditioning the apparatus for normal transport of a record carrier and a second operating device for conditioning the apparatus for fast forward and/or rewind transport of the record carrier, in which when the second operating device is actuated any function for which the apparatus may have been conditioned by means of the first operating device is cancelled for the time during which the second operating device is in the operative state but at the same time the first operating device remains in its operative position.

In a known apparatus of this type it is possible, while the apparatus is in the normal forward transport function to condition it for one of the functions fast forward or rewind, the apparatus being automatically conditioned for normal transport again on termination of a fast forward or rewind function, which is an advantage in finding certain passages on a record carrier. In this apparatus the operating device for initiating and terminating a fast-transport function comprises a pivotable lever which, irrespective of whether or not the apparatus is performing a normal-transport function, can manually be pivoted from its inoperative position in opposite directions to two positions, the apparatus remaining conditioned for one of the two fast-transport functions only as long as the lever is manually held in the relevant position, no devices for locking the lever are provided, so that the lever when released returns to its inoperative position. It should be noted that recording and/or playback apparatuses are known in which the operating devices for conditioning the apparatus for the various tape-transport functions are held in the operative positions by a locking device. However, when such an operating device is operated the locking device releases any other operating device which may have been operative, so that the latter operating device returns to its inoperative position, the associated function being completely cancelled.

It is an object of the invention to further improve the possibilities of operating an apparatus of the aforementioned type. For this purpose the invention is characterized in that for both operating devices there is provided a common locking device which can be shifted against the action of a spring and serves to hold the operating devices in their operative positions, and which only when the first operating device is locked is moved into a position in which co-operation of the second operating device with the locking device is prevented. This enables the record carrier to be transported in the fast forward or the rewind function without the apparatus being conditioned for normal transport, the relevant operating device being locked in its operative positions, and also enables the record carrier to be transported in the fast forward or rewind function while the apparatus is conditioned for normal-transport function. The operating device, which in this case is not held by the locking device, is maintained in the relevant operative position by hand. The first mode of operation will be chosen when comparatively large lengths of the tape are to be transported, because the operating device need not continuously be maintained in the relevant position by hand, while the second mode of operation provides advantages if, for example, for repeating a passage, short lengths of tape are to be transported, whereupon normal transport is immediately resumed.

Embodiments of the invention will now be described, by way of example, with reference to the accompanying diagrammatic drawings, in which.

Figure 1:
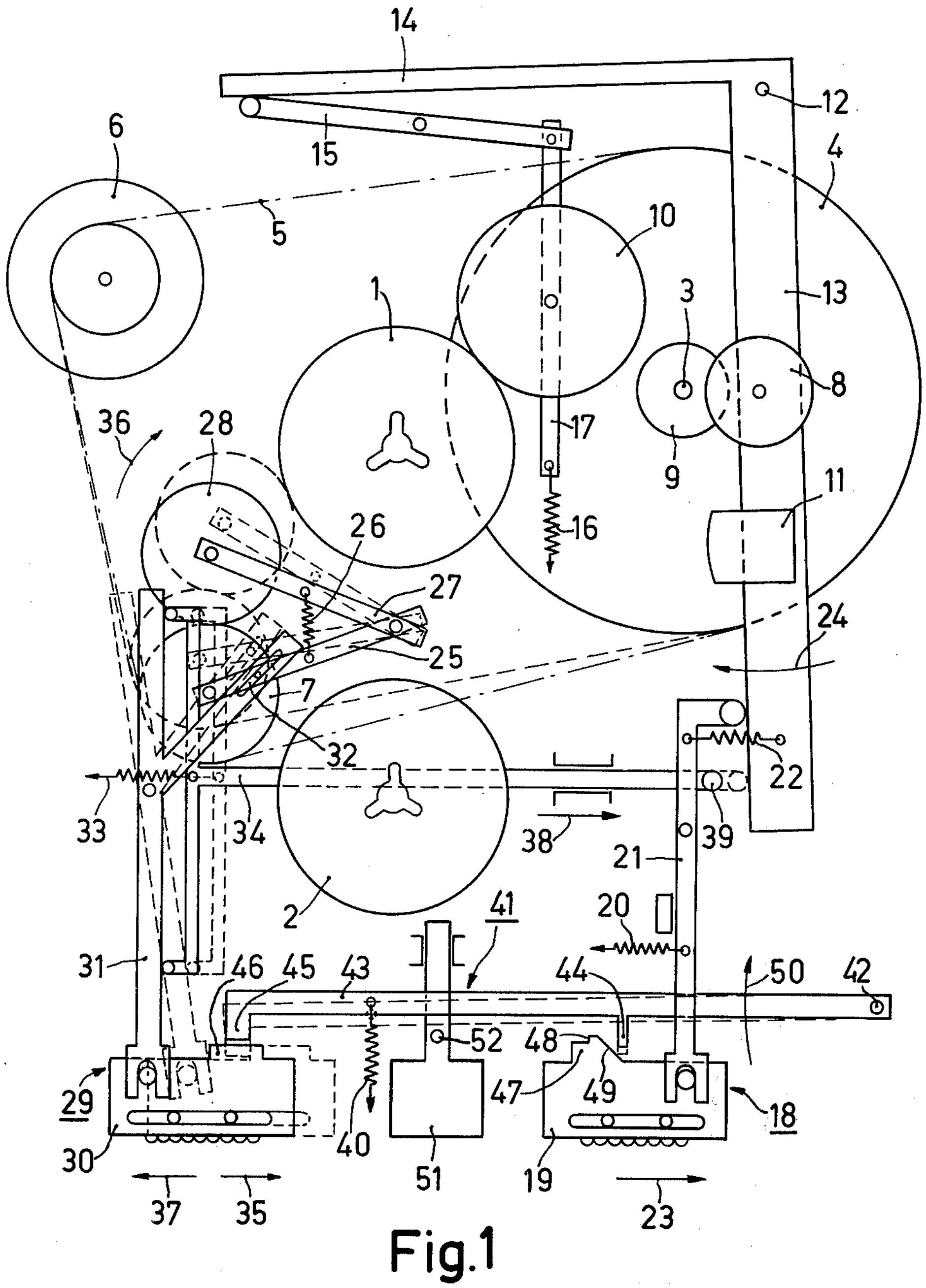
FIG. 1 is a diagrammatic plan view of a first embodiment of the invention in the non-operative state.
Figure 2:
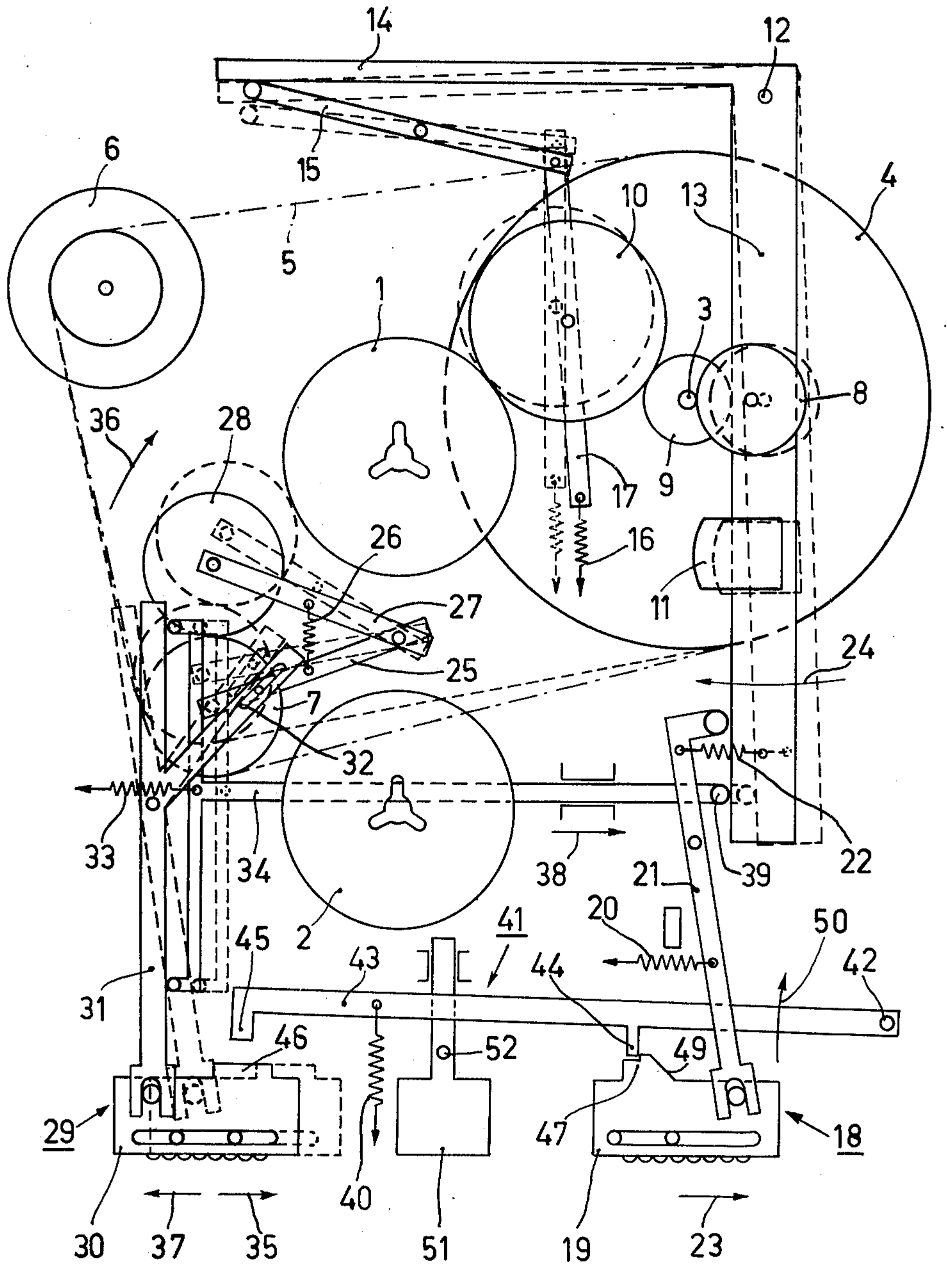
FIG. 2 is a diagrammatic plan view of the embodiment of FIG. 1 in an operative state.

Referring now to FIGS. 1 and 2, reference numerals 1 and 2 denote a take-up hub and a supply hub respectively of a recording and/or playback apparatus on which either reels or flangeless spools accommodated in cassettes may be placed. The apparatus further has a flywheel 4 which is secured to a drive shaft 3 and can be driven by a motor 6 by means of a belt 5 which also runs over, and drives, an idler wheel 7.

The record carrier runs, in a manner not shown, past the drive shaft 3 to which it may be urged by a pressure roller 8 in a conventional manner in the normal-transport function. In this normal-transport function the take-up hub 1 is driven via an idler wheel 10 which may be caused to engage between the hub and a shoulder 9 on the flywheel 4. The pressure roller 8 and a magnetic head 11, which also co-operates with the record carrier in the normal-transport function, are arranged on a bell-crank lever 13 which is adapted to pivot about a pin 12 and the free arm 14 of which is hingedly connected to one end of another lever 15 the other end of which is hingedly connected to an arm 17 which is biassed by a tension spring 16 and carries the idler wheel 10. In FIG. 1 the positions of the pressure roller, of the idler wheel and of the aforementioned lever which these components occupy when the apparatus is not conditioned for the normal-transport function are shown in solid lines. To condition the apparatus for operative and non-operative function of the normal-transport a first operating device 18 is provided which comprises a slide knob 19 which via a lever 21 biassed by a spring 20 co-operates with the bell-crank lever 13, a spring 22 urging the two levers to one another. By sliding the knob 19 in the direction indicated by an arrow 23 the bell-crank lever 13 is moved in the direction indicated by an arrow 24, thereby conditioning the apparatus for the normal-transport function; this function of the apparatus is shown in solid lines in FIG. 2.

In the fast-forward and rewind functions the record carrier is driven in known manner in that the respective hub 1 or 2 is directly driven, the pressure roller 8 being disengaged from the drive shaft 3. The hub 2 is driven by means of the idler wheel 7 which is mounted on an arm 25. The hub 1 is driven by a further idler wheel 28 which is continuously maintained in engagement with the idler wheel 7 by a spring 26 and is mounted on a pivotable arm 27. In the position shown in solid lines in FIG. 1 the apparatus is not conditioned for a fast-transport function and hence the idler wheels 7 and 28 do not engage the hubs 2 and 1 respectively. The fast-transport functions may be operated on and off by means of a second operating device 29 which comprises a slide knob 30 which is capable of pivoting a lever 31 which is positively connected to the lever 25 by a pin-and-slot connection. The inoperative position of this operating device is determined by a forked slide member 34 loaded by a spring 33. When the slide knob 30 is shifted in the direction indicated by an arrow 35 the idler wheels 7 and 28 are shifted in the direction indicated by an arrow 36 via the lever 31, the wheel 28 engaging the hub 1, so that the apparatus is conditioned for the fast-forward function. These positions of the displaceable parts of the apparatus are shown in broken lines in FIGS. 1 and 2. Similarly, when the slide knob 30 is shifted in the direction indicated by an arrow 37 the idler wheels 7 and 28 are shifted in a direction opposite to that indicated by the arrow 36, the idler wheel 7 engaging the hub 2, so that the apparatus is conditioned for the rewind function.

Each time the lever 31 is pivoted, i.e. each time the apparatus is conditioned for a fast-transport function, the slide member 34 is shifted in the direction indicated by an arrow 38. The free end 39 of the slide member 34, which extends into the path of the lever 13, ensures that this lever is pivoted in a direction opposite to that indicated by the arrow 24, at least when this lever previously was in the position in which the apparatus was conditioned for the normal-transport function. Such a case is shown in broken lines in FIG. 2. Thus, when the apparatus is conditioned for a fast-transport function the normal-transport function for which it may have been conditioned is cancelled, but only for the period during which it is conditioned for a fast-transport function, because when this fast-transport function is terminated the slide member 34 returns to its initial position, whereupon the lever 13 is shifted by the spring 22 in the direction indicated by the arrow 24, so that the normal-transport function is restored.

The two operating devices 18 and 29 have a common locking device 41 which is displaceable against the action of a spring 40 and serves to hold the operating devices in their respective operative positions. This locking device comprises a lever 43 which is arranged to pivot about a pin 42 and has two locking projections 44 and 45 associated with the slide knobs 19 and 30 respectively. The counterpart of the projection 45 is a projection 46 which is provided on the slide knob 30 and against which the projection 45 can bear, thereby determining the rest position for the lever 43 when both slide knobs are in the off position. The two lateral edges of the projection 46 serve as stops for the corresponding lateral surfaces of the projection 45 when the locking device is rendered operative, in which case the latter projection holds the slide knob in the respective operative position according as the knob is shifted in the direction indicated by the arrow 35 or that indicated by the arrow 37. As a counterpart to the projection 44 there is provided on the slide knob 19 a projection 47 which is formed with a recess 48 in which the projection 44 engages when the slide knob is moved in the direction indicated by the arrow 23 into its on-position, so that the knob is held in this position. The projection 47 also has an inclined face 49 which co-operates with the projection 44 when the slide knob 19 is moved to its operative position, so that the lever 43 is displaced in the direction indicated by an arrow 50, until the projection 44 engages in the recess 48, the projection 45 being moved out of the operating range of the projection 46 on the slide knob 30, with the result that in such a case the slide knob 30 cannot be locked, as is shown in solid lines in FIG. 2.

An operating device held in the operative-position by the locking device 41 may be returned to its initial position, for example, by means of a special push-button 51 which, when operated, by means of a projection 52 pivots the lever 43 of the locking device against the action of the spring 40 through a distance such that the projection 44 or 45 releases the associated slide knob 19 or 30 respectively, so that the knob returns to its initial position under the influence of the elements of the apparatus which it has shifted. Obviously, as an alternative the slide knobs themselves may be designed so as to be capable of cancelling the locking action.

The described steps ensure that when the apparatus is not conditioned for the normal-transport function by means of the operating device 18 it may be conditioned for the fast-forward or rewind functions by means of the operating device 29 which subsequently is held in the respective operative position by the locking device 41; such a case is shown in broken lines in FIG. 1 for the fast-forward function. However, if the operating device 18 is in its operative position, i.e. the apparatus is conditioned for the normal-transport function, the operating device 29 enables the normal-transport function to be interrupted and the apparatus to be conditioned either for the fast-forward function or for the rewind function, but in this case the operating device 29 must be maintained in the operative position by hand, because the locking device is inoperative with respect to the operating device 29; such a case is shown in broken lines in FIG. 2 for the fast-forward function. When the operating device 29 is released, it returns to its initial position and at the same time the normal-transport function is resumed. Thus there are two possibilities of fast transport of the record carrier, namely either starting from the rest position of the record carrier, in which event the relevant operating device is locked, which is expedient for fast transport of comparatively long duration, or starting from the normal-transport of the record carrier, in which event the relevant operating device is not locked, which is of advantage in particular for fast transport of short duration, which in addition, without any further action being required, is immediately followed by the normal-transport of the record carrier. As will be appreciated, the arrangement according to the invention provides a wide variety of operating possibilities for such an apparatus which may be selected according to the instantaneous requirements.

Figures 3, 4:
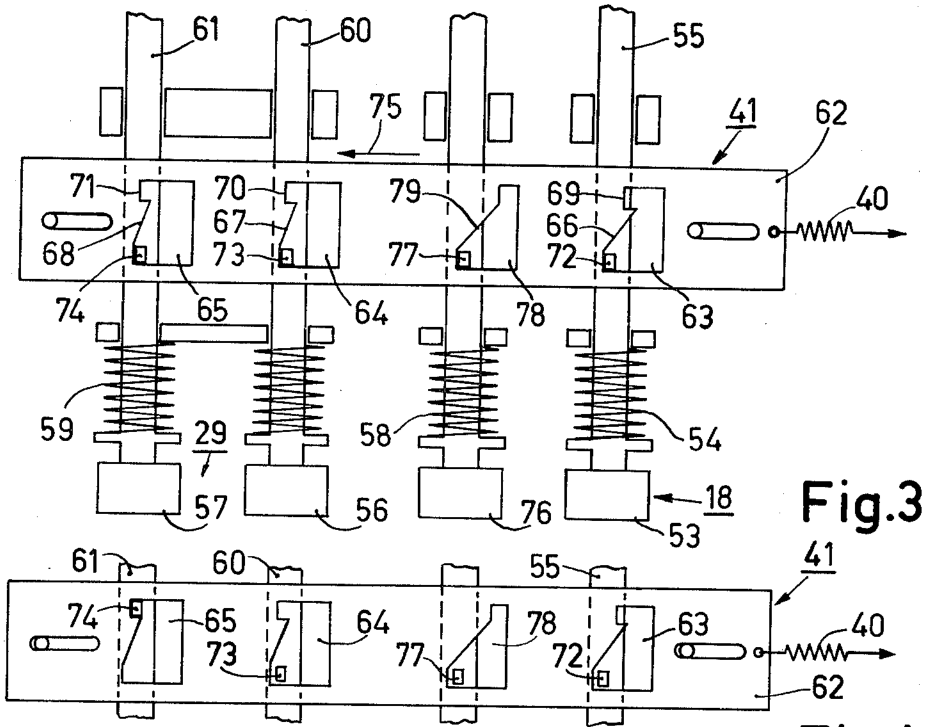
FIG. 3 is a diagrammatic view of a push-button locking mechanism of a second embodiment.
FIGS. 4 and 5 are diagrammatic views of a portion of the embodiment of FIG. 3 in different operative states.

In the embodiment shown in FIG. 3 the first operating device 18 for conditioning the apparatus for the normal-transport function comprises a push-button 53 which can be moved into its operative position against the action of a spring 54, which causes further elements of the apparatus, which are not shown, to be shifted by means of a control rod 55 to initiate the corresponding functions of the apparatus, but this may alternatively be effected by electro-magnetic means, in which case the control rod is required to operate electric control contacts only.

The second operating device 29 for conditioning the apparatus for the fast-forward and rewind functions comprises two pushbuttons 56 and 57, one for the fast-forward function and the other for the rewind function. These two pushbuttons also shift control rods 60 and 61 respectively against the action of springs 58 and 59 respectively to transmit the control instructions to the relevant elements of the apparatus, which are not shown either.

In this embodiment also the two operating devices have a common locking device 41 which is displaceable against the action of a spring 40 and is in the form of a strip 62 which extends at right angles to the control rods 55, 60 and 61 and is displaceable in the direction of its length. Near the control rods this strip is provided with apertures 63, 64 and 65 respectively which extend in the direction of length of the control rods and each along one longitudinal edge have an inclined face 66, 67 and 68 respectively and a recess 69, 70 and 71 respectively. The inclined face 66 is steeper than the corresponding faces 67 and 68. Projections 72, 73 and 74 provided on the control rods protrude into the apertures and the said longitudinal edges of the apertures tend to engage these projections under the action of the spring 40.

Figure 5:
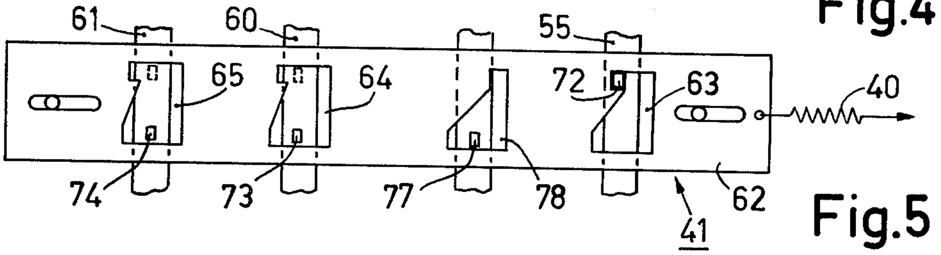

If one of the pushbuttons is depressed into its operative position, the co-operation of the projections with the inclined faces causes the strip 62 to be moved in the direction indicated by an arrow 75, until the projections snap into the recesses, so that the relevant pushbutton is held in its operative position. FIG. 4 shows the situation which results from a depression of the pushbutton 57, and FIG. 5 shows the situation which results from a depression of the pushbutton 53. Owing to the fact that the inclined face 66 is steeper than the faces 67 and 68, depression of the pushbutton 53 causes the strip 62 to be moved in the direction indicated by the arrow 75 through a distance greater than when the pushbuttons 56 and 57 are depressed. This ensures that when the pushbutton 53 has been depressed the pushbuttons 56 and 57 can manually be moved into their operative positions, but they are not locked in these positions, because in this case, as the broken-line representation of the projections 73 and 74 in FIG. 5 shows, these projections cannot snap into the respective recesses 70 and 71. In such a case, however, it is ensured, but this is not shown in the drawings, for example by lifting the pressure roller from the drive shaft by electromagnetic means or in a manner similar to that described with respect to the embodiment shown in FIGS. 1 and 2, that the normal-transport function for which the apparatus is conditioned by means of the pushbutton 53 is interrupted during the time that one of the pushbuttons 56 or 57 is held in its operative position, the pushbutton 53 itself, however, remaining in its operative position, so that when on release of the relevant pushbutton 56 or 57 this pushbutton returns to its inoperative position, the normal transport of the record carrier is immediately resumed. If one of the pushbuttons 56 and 57 is depressed and then the pushbutton 53 is operated, the locking of the respective depressed pushbutton is cancelled, so that it returns to its inoperative position, after which the pushbutton 53 only remains locked in its operative position.

A pushbutton locked in its operative position can be returned to its inoperative position by a pushbutton 76, which also has a projection 77 which protrudes in an aperture 78 in the strip 62. This aperture 78 has an inclined face 79 which is even steeper than the inclined face 66, so that operation of the pushbutton 76 causes the strip 62 to be shifted through a distance such that the locking of the pushbutton 53 is cancelled with certainty, which in a relevant case applies to the pushbuttons 56 and 57 also.

Thus in this embodiment also it is ensured that in the non-operative condition of the operating device 18 for conditioning the apparatus for the normal-transport function the operating device 29 for conditioning the apparatus for the fast-forward and rewind functions is held locked in its relevant operative position, but in the operative condition of the operating device 18 this device 29 may be moved into its operative position. However, it cannot be locked in these positions, the operating device 18 remaining in its operative position but the function for which the apparatus is conditioned by this device being cancelled for the time during which the operating device 29 is maintained in an operative position.

Figure 6:
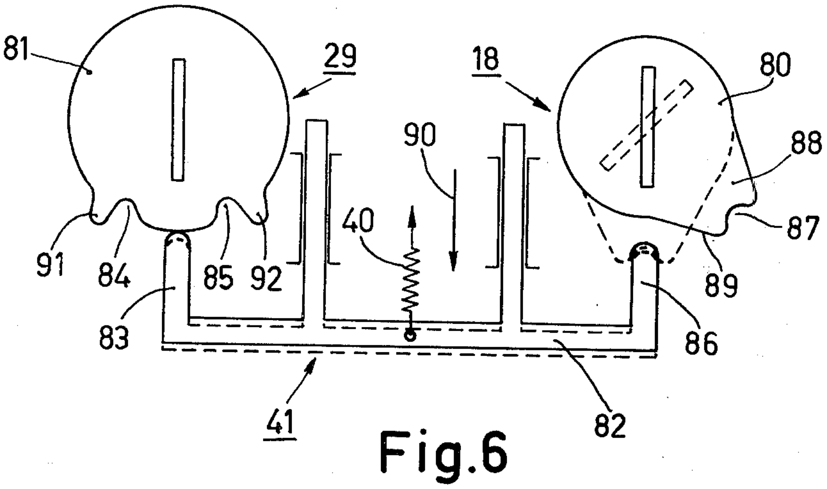
FIG. 6 is a diagrammatic view of a portion of a rotary knob embodiment of the invention.

In the embodiment shown in FIG. 6 the operating devices 18 and 29 are in the form of rotary knobs 80 and 81 which have as a common locking device 41 a U-member 82 which is displaceable in the direction of its limbs against the action of a spring 40. A free end 83 of the U-member serves as a locking device for the rotary knob 81 by snapping into a recess 84 or 85 formed in the circumference of the knob. The other free end 86 forms the locking device for the rotary knob 80 and co-operates with a recess 87 formed in an extension 88 of this knob. The edge 89 of the extension forms an inclined surface by means of which the U-member 82 when its end 86 engages in the recess 87 may be displaced in the direction indicated by an arrow 90 through a distance such that its other end 83 is prevented from engaging with the rotary knob 81, as is shown in broken lines in FIG. 6. In such a case the rotary knob 81 when operated is not held in its operative positions by engagement with the locking device and when released is returned to its initial positions by resetting means, not shown; the operative positions are defined by stops 91 and 92 which are provided on the rotary knob 81 and cooperate with the end 83 of the U-member. The method of operation of the construction according to this embodiment is analogous to the method described hereinbefore with reference to the other embodiments.

Obviously the embodiments described may be modified in a variety of manners without departing from the scope of the invention. This applies in particular to the construction of the two operating devices and the associated locking device. Examples of such modifications consist in that the operating devices may have pivotable pushbuttons and the locking device may be a pivotable strip.

What is claimed is:

1. In a recording and/or playback apparatus, an operating device locking mechanism comprising:

a first operating device for conditioning the apparatus for normal transport of a record carrier, said device being movable from a non-operative to an operative state;

a second operating device for conditioning the apparatus at least for rewind transport of the record carrier, said device being movable from a non-operative to an operative state;

means responsive to movement of said second operating device to an operative state for cancelling a function for which the apparatus is conditioned by said first operating device only for the time during which said second operating device is in an operative state;

common locking means responsive to the state of said first operating device for locking said first operating device in the operative state, and for locking said second operating device in an operative state upon movement from the non-operative state to an operative state only if said first device is in the non-operative state at a time said movement is initiated; and means for releasing said common locking means.

2. An operating device locking mechanism as claimed in claim 1 wherein said second operating device is movable into either of two operative states for conditioning said apparatus for rewind transport of the record carrier in the first of the operative states, and for conditioning for fast/forward transport of the record carrier in the other operative state.

3. An operating device locking mechanism as claimed in claim 1 wherein said common locking means comprises means for releasing said second operating device from a locked operative state upon movement of said first device from the non-operative to the operative state.

4. An operating device locking mechanism for a recording and/or playback apparatus, comprising:

a first operating device for conditioning the apparatus for normal transport of a record carrier, said device being movable from a non-operative to an operative state;

a second operating device for conditioning the apparatus at least for rewind transport of the record carrier, said device being movable from a non-operative to an operative state;

means responsive to movement of said second operating device to an operative state for cancelling a function for which the apparatus is conditioned by said first operating device only for the time during which said second operating device is in an operative state;

common locking means comprising a locking member, means for biassing said locking member toward a first position in which said operating devices are unlocked, means for moving said member into second and third positions in response to a movement of said devices, said member being moved into said second position upon movement of said second device from the non-operative to an operative state while said first device is in the non-operative state, so as to engage a portion of and to lock said second device in the operative state, said member being moved into the third position upon movement of said first device from the non-operative to the operative state so as to lock said first device in the operative state, said second device being unlocked at all times that said member is in said third position, and means for releasing said second operating device from a locked operative state upon movement of said first device from the non-operative to the operative state; and means for releasing said common locking means.

5. An operating device locking mechanism as claimed in claim 4 wherein said second operating device is movable into either of two operative states for conditioning said apparatus for rewind transport of the record carrier in the first of the operative states, and for conditioning for fast/forward transport of the record carrier in the other operative state.

* * * * *